Sept. 3, 1957 M. B. PREEMAN 2,805,052
MOBILE ASPHALT PLANT
Filed Oct. 4, 1954 2 Sheets-Sheet 1

INVENTOR.
MARVIN B. PREEMAN
BY HIS ATTORNEYS.
HARRIS, KIECH, FOSTER & HARRIS

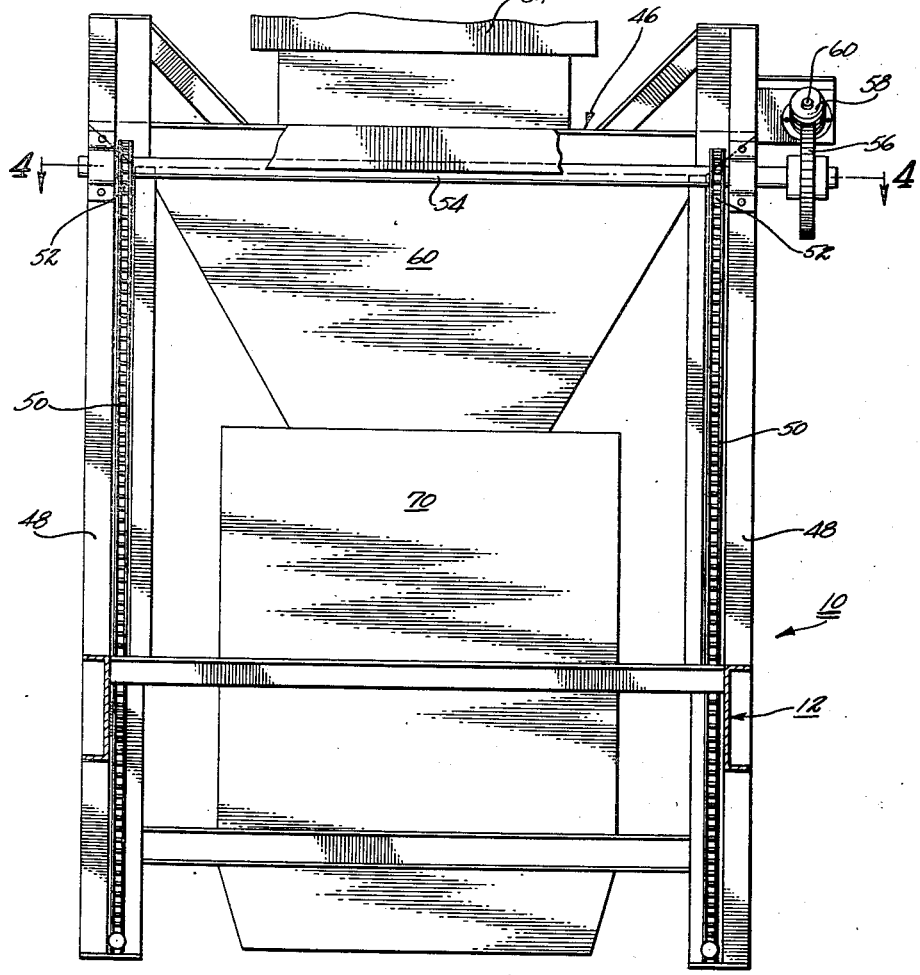

United States Patent Office 2,805,052
Patented Sept. 3, 1957

2,805,052

MOBILE ASPHALT PLANT

Marvin B. Preeman, Los Angeles, Calif., assignor to Standard Steel Corporation, Los Angeles, Calif., a corporation of California Application October 4, 1954, Serial No. 459,924

3 Claims. (Cl. 259—159)

The present invention relates to a mobile, material processing plant and, more particularly, to a mobile plant for producing aggregate-binder mixtures, the invention being considered herein as embodied in a mobile asphalt plant, although it will be understood that the invention is susceptible of other applications.

A primary object of the invention is to provide a mobile plant which includes a mobile, vehicular chassis carrying all of the material processing and dispensing components essential to the operation of the plant. Thus, the invention provides a mobile plant which may be moved readily from one location to another as a unit, which is an important feature of the invention. For example, considering the invention as embodied in a mobile asphalt plant for producing asphalt mixes for paving projects, the plant of the invention may be transported to any desired site convenient to a particular paving project and placed in operation with a minimum expenditure of time and effort, whereby hauling time from the plant to the paving project may be minimized, which is an important feature.

An important object of the invention is to provide a mobile plant wherein the chassis is provided with a transverse vehicle passageway therethrough and carries an elevator which is movable vertically between upper and lower positions along a path intersecting the vehicle passageway, the elevator carrying material processing and dispensing means capable of dispensing processed material into a vehicle in the vehicle passageway when the elevator is in its upper position. With this construction, the elevator may be moved into its lower position to minimize the overhead clearance required by the plant while in transit, and may be moved into its upper position when in operation to permit a vehicle, such as a dump truck, to pass through the plant so as to receive processed material from the processing and dispensing means carried by the elevator.

Another object is to provide a mobile plant wherein the material processing and dispensing means carried by the elevator includes a mixing unit for producing aggregate-binder mixtures. Other objects in this connection include the provision of aggregate grading means carried by the elevator, means carried by the elevator for weighing out the graded aggregates and delivering them to the mixing unit, and means for delivering asphalt or other binder to the mixing unit for mixing with the aggregates.

Another object is to provide a mobile plant which includes an aggregate dryer carried by the chassis, and which includes vertical conveyors for elevating ungraded aggregates from adjacent ground level into the dryer and for elevating the dried aggregates into the aggregate grading means carried by the elevator.

Another object is to provide a mobile plant wherein the aforementioned vertical conveyors have portions which are movable into retracted positions while the plant is in transit so as to minimize the ground and overhead clearances required for the plant.

The foregoing objects, advantages and features of the present invention, together with various other objects, advantages and features thereof which will become apparent, may be attained with the exemplary embodiment of the invention illustrated in the accompanying drawings and described in detail hereinafter. Referring to the drawings:

Fig. 3 is an enlarged, fragmentary sectional view taken along the arrowed line 3—3 of Fig. 2; and Fig. 4 is a fragmentary sectional view taken along the arrowed line 4—4 of Fig. 3.

Figure 1:
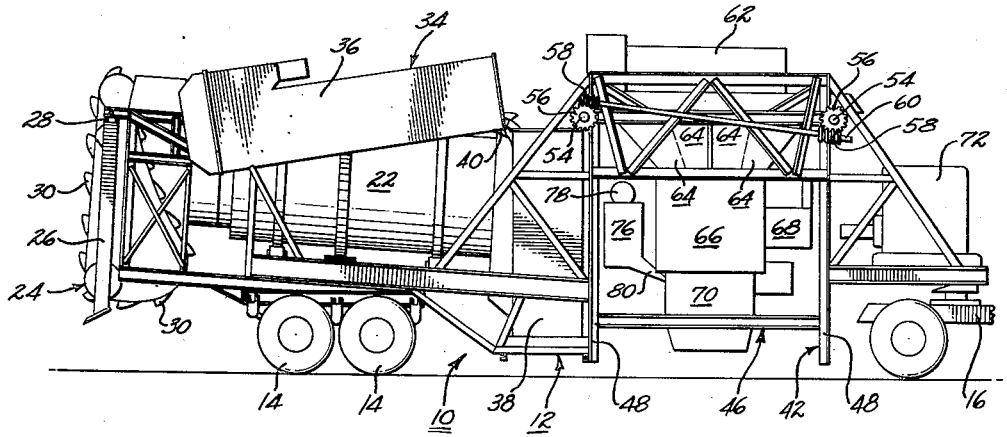
Fig. 1 is a side elevation of the mobile plant of the invention showing various components of the plant in their retracted positions providing minimum ground and overhead clearance requirements for the plant while in transit.
Figure 2:
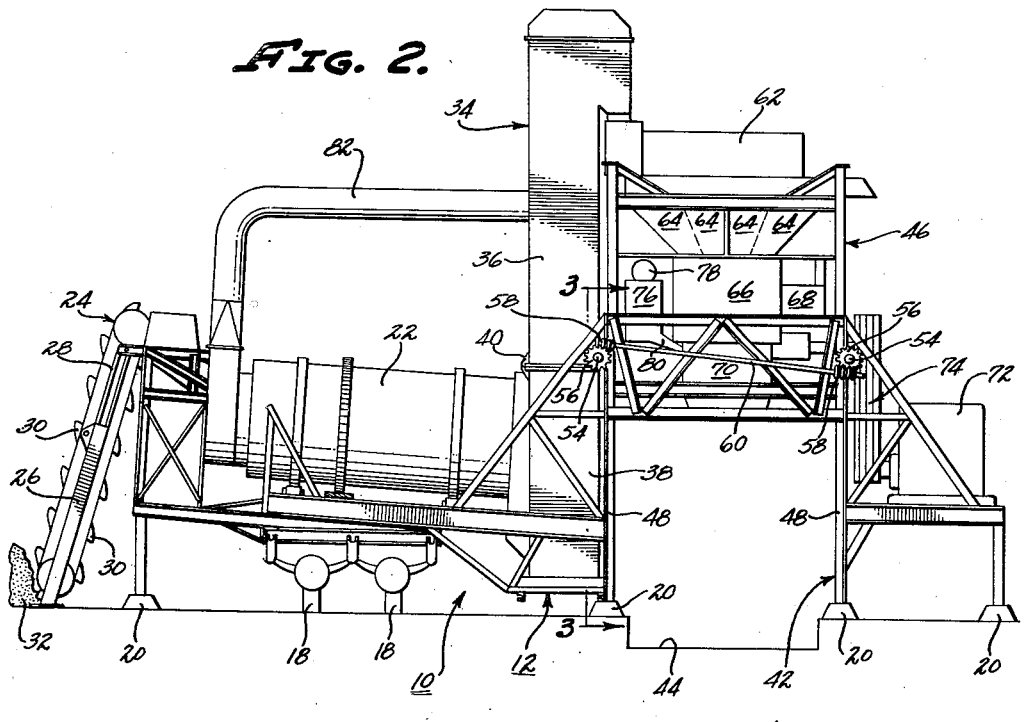
Fig. 2 is a side elevation of the mobile plant of the invention with various components thereof in their extended positions to place the plant in condition for operation.

Referring particularly to Figs. 1 and 2 of the drawings, the mobile plant of the invention includes a vehicular chassis 10 in the form of a semi-trailer, the chassis having a frame 12 mounted on wheels 14 at one end and adapted to have its other end mounted on a conventional tractor 16 when the plant is in transit. As shown in Fig. 2 of the drawings, when the plant is set up for operation, the wheels 14 may be removed and their axles supported on blocks 18. Various other portions of the frame 12 are placed on blocks 20, of concrete, or other suitable material, to permit removal of the tractor 16.

Mounted on the frame 12 is an aggregate dryer 22 which is supplied with aggregate by a first vertical conveyor 24, shown as a conveyor of the bucket type. The frame of the conveyor 24 is extensible and contractible, having a power portion 26 and an upper portion 28 in telescoping relation so that the lower portion thereof may be moved from an upper, retracted position, as shown in Fig. 1 of the drawings, to a lower, extended position, as shown in Fig. 2 of the drawings. With the frame of the conveyor 24 in its extended position, the buckets of the conveyor 24, identified by the numeral 30, scoop aggregates from a pile 32 and deliver them to the dryer 22. With the frame of the conveyor 24 telescoped, the chains, or other elements, carrying the buckets 30 may be suitably secured to the frame 12, as suggested in Fig. 1 of the drawings.

From the dryer 22, the dried and heated aggregates are discharged into a second vertical conveyor 34, which may also be of the bucket type. This conveyor is provided with an upper portion 36 which is movable relative to a lower portion 38 thereof between a lower, retracted position, as shown in Fig. 1 of the drawings, and an upper, extended position, as shown in Fig. 2 of the drawings, the upper portion 36 being hinged to the lower portion 38 at 40.

The frame 12 of the vehicular chassis 10 is provided adjacent the vertical conveyor 34 with a transverse vehicle passageway 42 through which a dump truck, or other vehicle, may be driven, a slight excavation 44, Fig. 2, being provided if necessary for adequate overhead clearance. Vertically aligned with the passageway 42 is an elevator 46 which is movable between a lower, retracted position, as shown in Fig. 1 of the drawings, and an upper, extended position, as shown in Fig. 2 of the drawings. The elevator 46 is movable along guides 48 forming part of the frame 12 of the vehicular chassis 10, means being provided for raising and lowering the elevator. In the particular construction shown, such means comprise chains 50, Figs. 3 and 4, each having one end connected to the elevator 46 and each trained over a sprocket 52, there being two pairs of chains 50 and two pairs of sprockets 52, respectively located on opposite sides of the elevator. The sprockets 52 of each pair are mounted on a common shaft 54 carried by the frame 12, the shafts 54 being provided with gears 56 respectively meshed with gears 58 on an actuating shaft 60 which may be rotated in any suitable manner to rotate the shafts 54 so as to raise and lower the elevator 46.

Carried by the elevator 46 at the upper end thereof is an aggregate grading means 62, such as a screening means, into which the heated and dried aggregates are discharged by the conveyor 34 when it and the elevator are in their extended positions, as shown in Fig. 2 of the drawings. The grading means 62 discharges graded aggregates into bins 64 carried by the elevator 46 below the grading means. Located below the bins 64 is a weigh hopper 66 connected to a suitable scale means shown diagrammatically at 68. With this setup, weighed amounts of the different aggregate grades in the bins 64 may be discharged into a mixing unit 70 carried by the elevator 46 below the weigh hopper 66, the mixing unit being connected to a power plant 72 on the frame 12 through a suitable driving connection 74. Also carried by the elevator 46 is a weigh hopper 76 for asphalt, or other binder, this weigh hopper being connected to a suitable scale means shown diagrammatically at 78 and being provided with a spout 80 discharging into the mixing unit 70.

Considering the operation of the invention, with the various components in the positions shown in Fig. 1 of the drawings, the mobile plant may be transported readily to any desired site, ample ground and overhead clearances being provided by virtue of the retraction of the various extensible and retractable components hereinbefore discussed. Upon arrival at the desired site, the vehicular chassis 10 is set on the blocks 18 and 20 and the excavation 44 is made, if necessary. After arrival at the desired site, the conveyor 24 and the conveyor 34 are extended into their operating positions, as shown in Fig. 2, and the elevator 46 is raised into its operating position, also as shown in Fig. 2. To dispose of dust from the dryer 22, a suitable stack 82 is provided, this stack either discharging vertically into the atmosphere, or, as shown in Fig. 2 of the drawings, being connected to a suitable dust disposal apparatus, not shown, such as a cyclone separator. With the plant so set up, all that is necessary to place it in operation is to connect the asphalt weight hopper 76 to a suitable source of asphalt, such as a supply tank, not shown, and to provide an aggregate pile 32 from which the conveyor 24 may receive aggregates.

Thus, it will be seen that the present invention provides a mobile plant which may be transported to the desired site and placed in operation with a minimum expenditure of time and effort, which means that the plant may be moved from time to time so that it will always be near any project with which it is being used. For example, in a road paving project, the plant may be moved every time the paving project progresses a few miles so as to minimize hauling time between the plant and the paving site, which is an important feature.

Although I have disclosed an exemplary embodiment of my invention herein for purposes of illustration, it will be understood that various changes, modifications and substitutions may be incorporated in such embodiment without departing from the spirit of the invention as defined by the claims hereinafter appearing.

I claim as my invention:

1. In an apparatus of the character described, the combination of: a mobile chassis having a transverse vehicle passageway therethrough; a structure carried by said chassis and movable vertically along a path which intersects said vehicle passageway, said structure being movable between a lower position wherein it is in said vehicle passageway and an upper position wherein it is above said vehicle passageway to provide for passage of a vehicle therethrough; material processing and dispensing means carried by said structure for dispensing processed material into a vehicle in said passageway; and means carried by said chassis on one side of said vehicle passageway for conveying material to said processing and dispensing means, including a conveyor having a lower portion which is mounted on said chassis and an upper portion which is hinged to said lower portion for pivotal movement about a horizontal axis so that said upper portion may be folded downwardly into a generally horizontal position to reduce the over-all height of said apparatus.

2. In an apparatus of the character described, the combination of: a mobile chassis having a transverse vehicle passageway therethrough; a structure carried by said chassis and movable vertically along a path which intersects said vehicle passageway, said structure being movable between a lower position wherein it is in said vehicle passageway and an upper position wherein it is above said vehicle passageway to provide for passage of a vehicle therethrough; material processing and dispensing means carried by said structure for dispensing processed material into a vehicle in said passageway; a material dryer carried by said chassis on one side of said vehicle passageway; means for conveying material from adjacent ground level to said dryer; and means for conveying material from said dryer to said processing and dispensing means, the conveying means last mentioned including a conveyor having a lower portion mounted on said chassis and an upper portion hinged to said lower portion for pivotal movement about a horizontal transverse axis so that said upper portion may be folded downwardly to reduce the over-all height of said apparatus, said last-mentioned conveying means being offset to one side of said dryer so that said upper portion thereof lies alongside said dryer when it is folded downwardly.

3. In an apparatus of the character described, the combination of: a mobile chassis having a transverse vehicle passageway therethrough; a structure carried by said chassis and movable vertically along a path which intersects said vehicle passageway, said structure being movable between a lower position wherein it obstructs said vehicle passageway and an upper position wherein it is above said vehicle passageway to provide for passage of a vehicle therethrough; first material processing means carried by said structure for dispensing material into a vehicle in said passageway; second material processing means carried by said chassis at one side of said vehicle passageway; and means for conveying material from said second processing means to said first processing means, including an elevator carried by said mobile chassis and offset to one side of said second processing means, said elevator having a hinged upper portion which is foldable downwardly about a horizontal transverse axis into a position alongside said second processing means.

References Cited in the file of this patent

UNITED STATES PATENTS

| | | |
|---|---|---|
| 1,478,812 | Barene | Dec. 25, 1923 |
| 1,832,787 | Penote | Nov. 17, 1931 |
| 2,190,044 | Pollitz | Feb. 13, 1940 |
| 2,207,303 | Prout et al. | July 9, 1940 |
| 2,298,160 | Pollitz | Oct. 6, 1942 |